United States Patent [19]

Heideman

[11] Patent Number: 4,826,061
[45] Date of Patent: * May 2, 1989

[54] VEHICLE LUGGAGE CARRIER WITH FLUSH TIEDOWN ENDCAP

[75] Inventor: Robert C. Heideman, Studio City, Calif.

[73] Assignee: AMCO Manufacturing Corporation, Hollywood, Calif.

[*] Notice: The portion of the term of this patent subsequent to Nov. 9, 1999 has been disclaimed.

[21] Appl. No.: 115,646

[22] Filed: Oct. 26, 1987

Related U.S. Application Data

[60] Continuation of Ser. No. 894,600, Aug. 8, 1986, abandoned, which is a continuation-in-part of Ser. No. 439,430, Nov. 5, 1982, Pat. No. 4,616,771, which is a division of Ser. No. 88,864, Oct. 29, 1979, Pat. No. 4,358,037.

[51] Int. Cl.4 .............................................. B60R 9/00
[52] U.S. Cl. .................................... 224/326; 224/321
[58] Field of Search ............... 224/321, 322, 323, 324, 224/325, 326, 42.44

[56] References Cited

U.S. PATENT DOCUMENTS

| | | |
|---|---|---|
| D. 250,461 | 12/1978 | Bott . |
| D. 250,464 | 12/1978 | Bott . |
| D. 264,203 | 5/1982 | Bott . |
| D. 282,155 | 1/1986 | Bott . |
| D. 283,117 | 3/1986 | Bott . |
| 3,519,180 | 7/1970 | Bott . |
| 3,545,660 | 12/1970 | Stephen .............................. 224/321 |
| 3,554,416 | 1/1971 | Bott . |
| 3,610,491 | 10/1971 | Bott . |
| 3,615,069 | 10/1971 | Bott . |
| 3,643,973 | 2/1972 | Bott . |
| 3,848,785 | 11/1974 | Bott . |
| 3,951,320 | 4/1976 | Bott . |
| 4,015,760 | 4/1977 | Bott . |
| 4,055,284 | 10/1977 | Bott . |
| 4,055,285 | 10/1977 | Bott . |
| 4,099,658 | 7/1978 | Bott . |
| 4,106,680 | 8/1978 | Bott . |
| 4,133,465 | 1/1979 | Bott . |
| 4,146,198 | 3/1979 | Bott . |
| 4,156,497 | 5/1979 | Bott . |
| 4,162,755 | 7/1979 | Bott . |
| 4,165,827 | 8/1979 | Bott . |
| 4,170,322 | 10/1979 | Bott . |
| 4,174,794 | 11/1979 | Bott . |
| 4,175,682 | 11/1979 | Bott . |
| 4,182,471 | 1/1980 | Bott . |
| 4,222,508 | 9/1980 | Bott . |
| 4,239,139 | 12/1980 | Bott . |
| 4,266,708 | 5/1981 | Bott . |
| 4,274,570 | 6/1981 | Bott . |
| 4,277,009 | 7/1981 | Bott . |
| 4,295,587 | 10/1981 | Bott . |

(List continued on next page.)

Primary Examiner—Henry J. Recla
Assistant Examiner—Linda J. Sholl
Attorney, Agent, or Firm—Ashen Golant Martin & Seldon

[57] ABSTRACT

Several parallel slats are fixed to a vehicle deck. Flanges along both sides of each slat serve as a track for a sliding bracket. The sliding bracket has an internal clamp for securing it along its slat. The sliding bracket has either (1) a ring for attachment of a tiedown strap to the slat, plus a threaded hole for attachment of a temporary crossbar, or (2) a tilt-up stop to restrain luggage from sliding along the slats. On at least one end of each slat is a separate member, fixed to the vehicle and the slat, that also has a loop for attachment of a tiedown strap. This separate tiedown member matches the slat height and cross-section (taking into account not only the flanged track but also a trim strip in a top groove of the slat, and a formed gasket below the slat); consequently the sliding bracket can be moved on or off the end of the slat, unimpeded by the separate tiedown member. Each slat is roll-formed from sheet metal, forming an interior volume that is enclosed except at the ends of the slat; the separate tiedown member has a tongue that fits into this volume, and the tiedown member itself serves as an end cap that closes off the interior volume of the slat. The carrier also has a permanent luggage-restraining crossbar at one end of the outboard two slats.

16 Claims, 8 Drawing Sheets

U.S. PATENT DOCUMENTS

| | | |
|---|---|---|
| 4,323,182 | 4/1982 | Bott . |
| 4,342,411 | 8/1982 | Bott . |
| 4,358,037 | 11/1982 | Heideman .............................. 224/321 |
| 4,364,500 | 12/1982 | Bott . |
| 4,427,141 | 1/1984 | Bott . |
| 4,428,517 | 1/1984 | Bott . |
| 4,431,123 | 2/1984 | Bott . |
| 4,432,478 | 2/1984 | Bott . |
| 4,433,804 | 2/1984 | Bott . |
| 4,440,333 | 4/1984 | Bott . |
| 4,442,961 | 4/1984 | Bott . |
| 4,448,336 | 5/1984 | Bott . |
| 4,460,116 | 7/1984 | Bott . |
| 4,469,261 | 9/1984 | Stapleton et al. ................ 224/326 X |
| 4,473,178 | 9/1984 | Bott . |
| 4,501,385 | 2/1985 | Bott . |
| 4,501,386 | 2/1985 | Rasor et al. .......................... 224/326 |
| 4,516,709 | 5/1985 | Bott . |
| 4,516,710 | 5/1985 | Bott . |
| 4,534,496 | 8/1985 | Bott ..................................... 224/326 |
| 4,588,117 | 5/1986 | Bott . |
| 4,616,771 | 10/1986 | Heideman ....................... 224/326 X |
| 4,618,082 | 10/1986 | Bell .................................. 224/326 X |

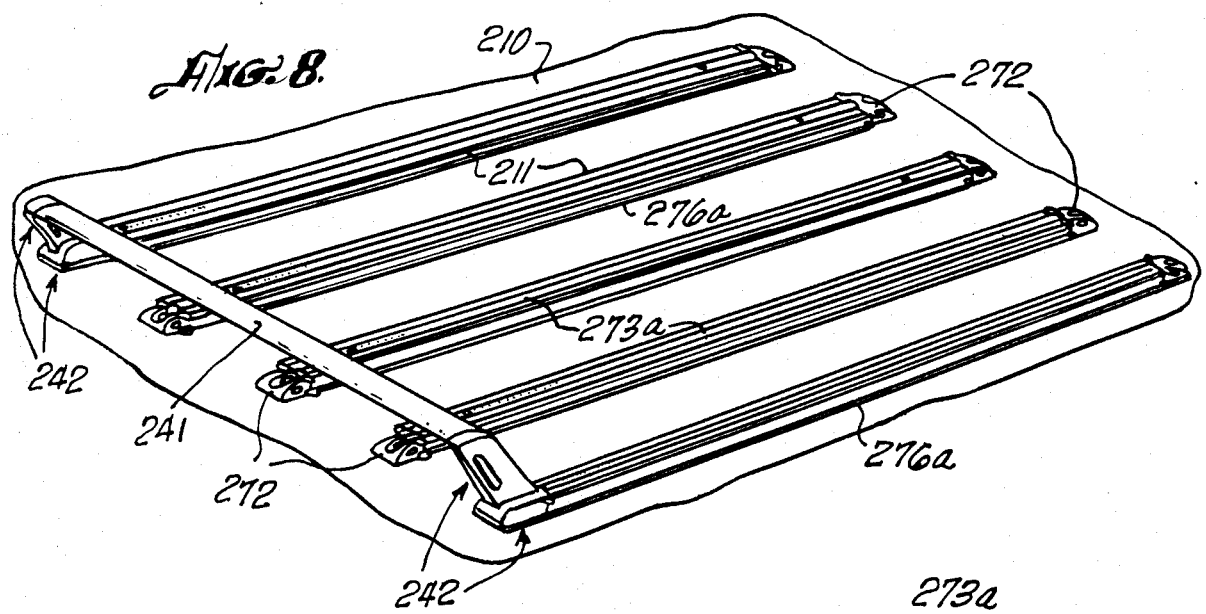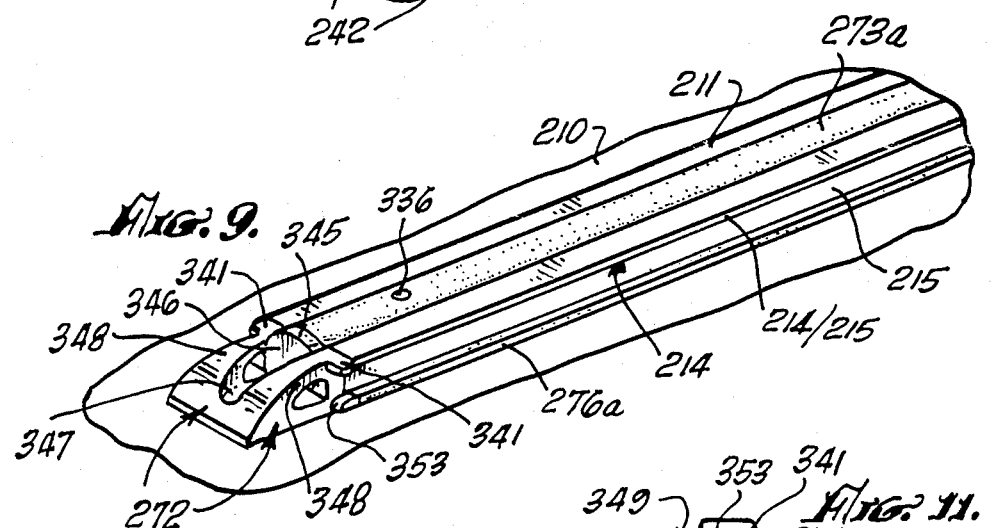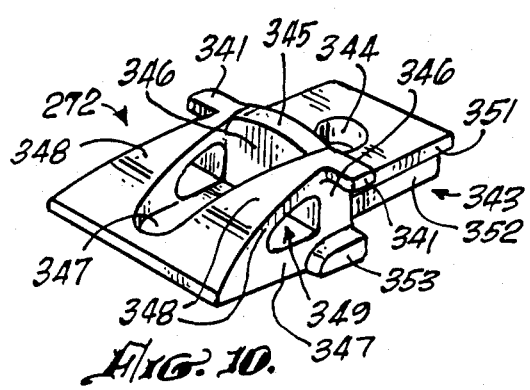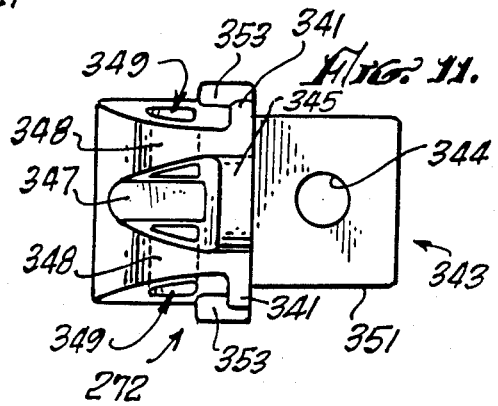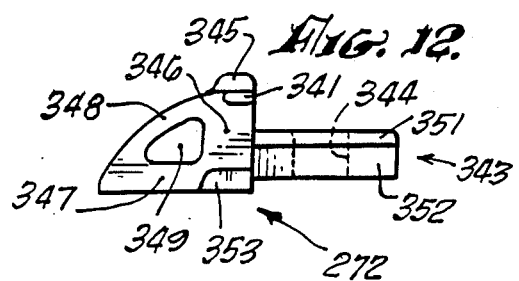

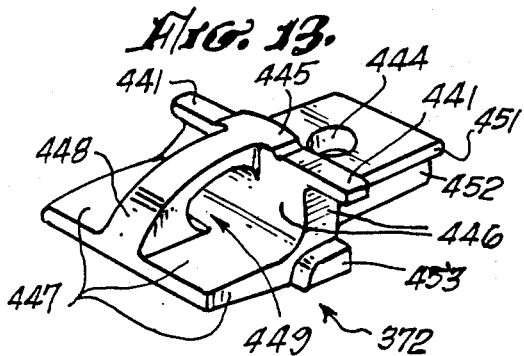
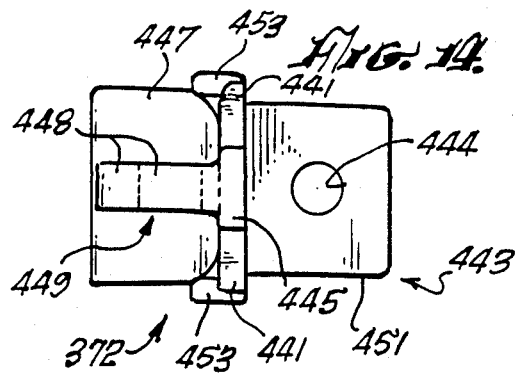
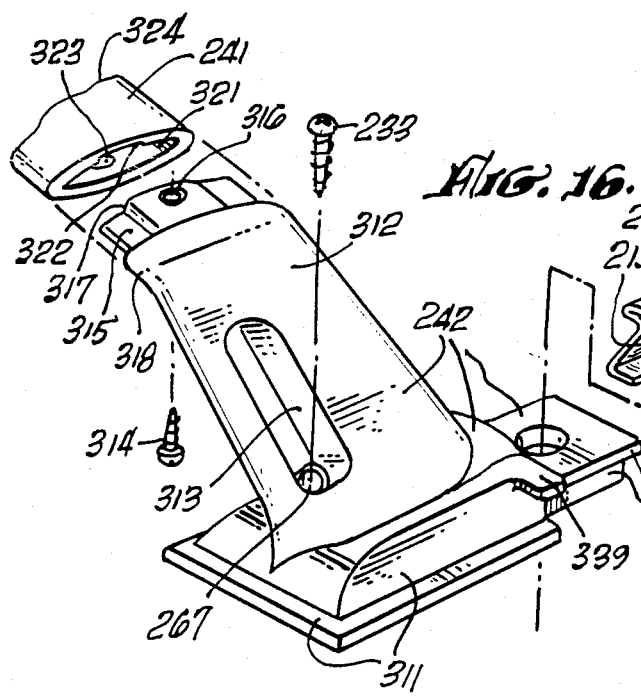
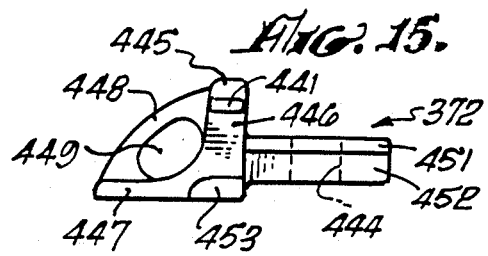
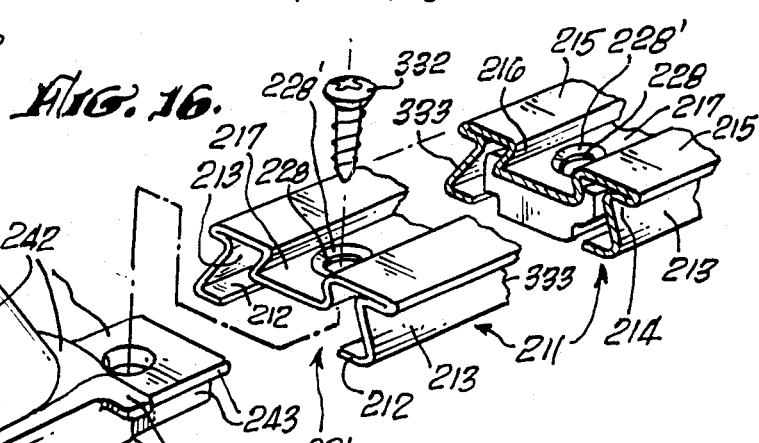
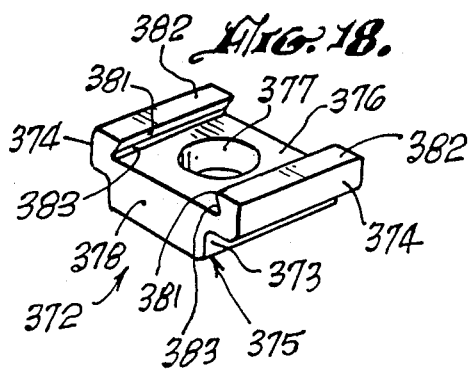
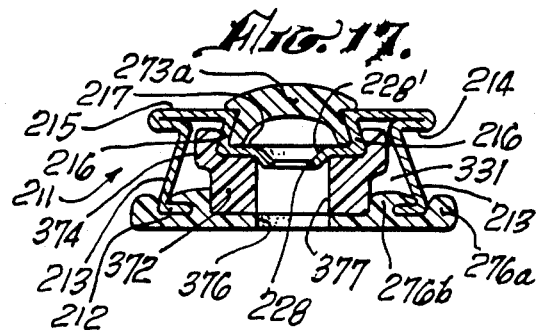

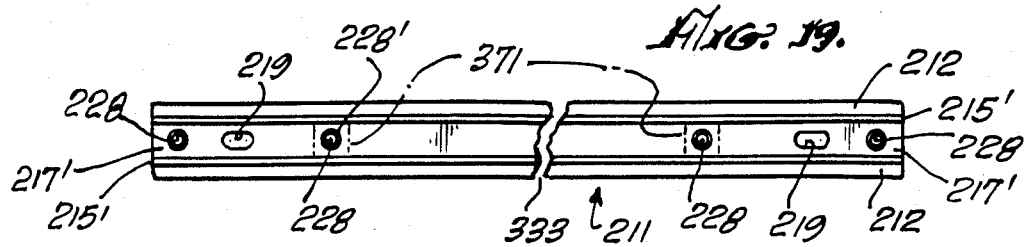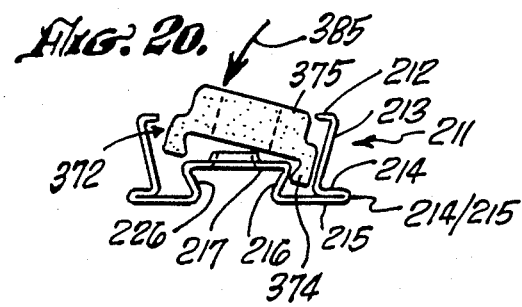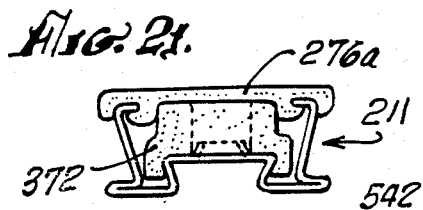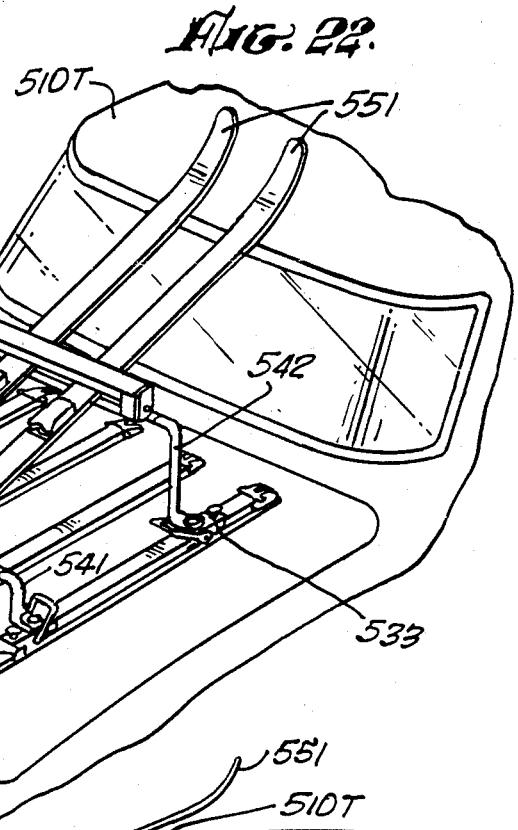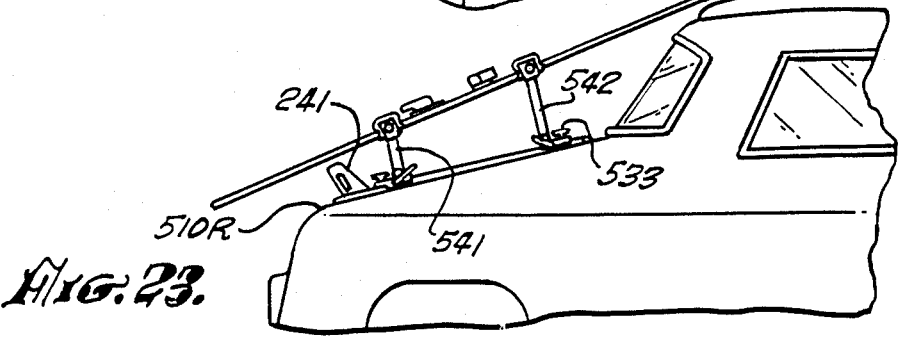

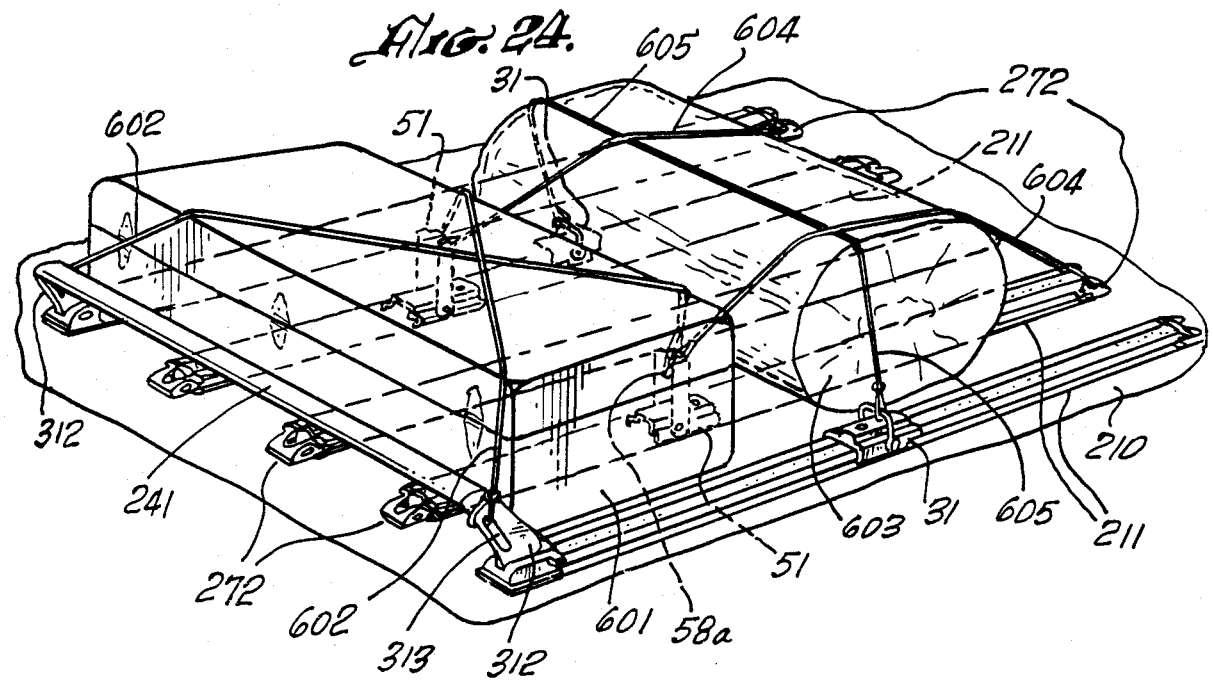
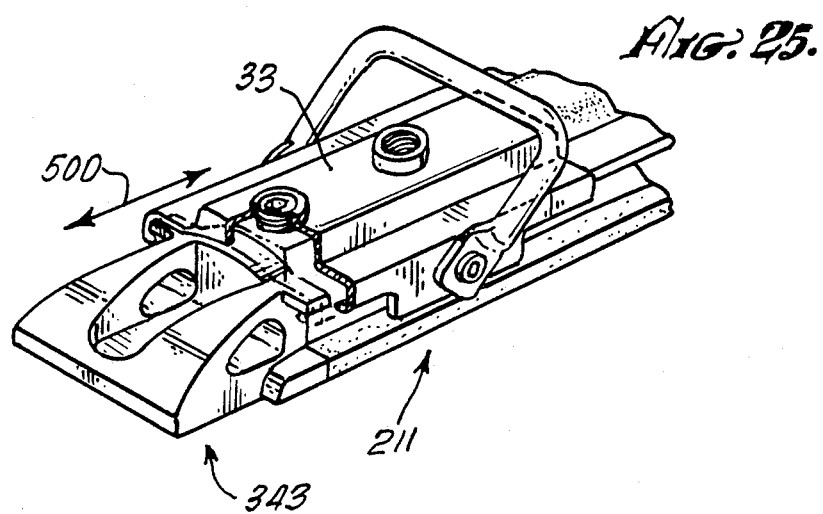

VEHICLE LUGGAGE CARRIER WITH FLUSH TIEDOWN ENDCAP

RELATED APPLICATIONS

This is a continuation of application Ser. No. 894,600, now abandoned, which was filed Aug. 8, 1986, which is a continuation-in-part of application No. 439,430, filed Nov. 5, 1982, and now issued as U.S. Pat. No. 4,616,771, which was in turn a divisional of application Ser. No. 88,864, filed Oct. 29, 1979, and also now issued, as U.S. Pat. No. 4,358,037.

BACKGROUND OF THE INVENTION

1. Field

This invention is in the field of vehicle-mounted luggage carriers. It relates in particular to improvements in the type of carrier which has two or more low slats permanently affixed to the vehicle, and associated with each slat a pair of slidable, lockable tie-downs.

2. Prior Art

Earlier luggage carriers of the permanently affixed type simply provided an enclosed area for luggage, often with fixed, elevated siderails and with endrails or crossbars that were slidable fore and aft along the siderails. In some cases mechanisms were provided for clamping the slidable endrails at particular positions along the siderails, and in some cases eyelets were provided in the siderails for securing ropes. Examples of these types appear in U.S. Pat. No. 3,554,416, filed in 1968 and issued to Bott in 1971.

By 1970 it was becoming customary to protect the vehicle surface with permanently affixed slats, of shallow cross-section, to support the luggage. Such a construction appears, for example, in U.S. Pat. No. 3,623,642, issued in 1971 to James Stephen.

Some of the slats used for this purpose were made of roll-forward sheet metal. In certain particular roll-formed designs, each slat, viewed in lateral cross-section, consisted of a pair of upstanding outer walls, a pair of upstanding inner walls spaced inward from the outer walls, two substantially horizontal (but sometimes arched) top supporting surfaces spanning the gap between each outer wall and its adjacent inner wall, and a recessed horizontal "web" portion connecting the bottom ends of the two inner walls. The luggage load was supported solely upon the two outer walls of the roll-formed sheet-metal slat, the inner walls being shallower and the "web" being elevated above the vehicle surface or any intermediate plastic or rubber mounting pad. Thus the principal purpose of the two inner walls and intervening web was to give the structure rigidity and style, and permit use of an adhesive-affixed or snap-in plastic trim strip down the recessed center of the slat, between the inner walls. Examples of such pre-1973 support slats were those in general production by the Amco Manufacturing Corporation, of North Hollywood, Calif., and others in use on Ford automobiles.

Commercial popularity later shifted to structures more compatible with the low, streamlined styling of modern vehicles. The upstanding siderails disappeared, and the tie-down function was transferred to the slats—which now extended most of the length of the mounting surface, and were either roll-formed sheet metal or extrusions. With this general design shift came an assortment of drawbacks:

Because the slats were very low and shallow, they were not readily amenable to attachment of cord or rope, so it became necessary to provide tie-downs affixed stationarily or slidably to the slats. (By "tie-down" is meant a loop, eye, hook or similar structure about or through which a rope or the like may be tied, strung or otherwise fastened. By "rope or the like" is meant a rope, cable, chain, strap, webbing, elastic cord, thong, or other elongate, generally but not necessarily nonrigid securing element—whether or not provided with an attached eye, hook or other fastening termination.) Stationary tie-downs proved inconvenient in use. Slidable tie-downs were attached either by means of external tracks or flanges along the top upper edges of the slats, or by making use of the central groove—previously used only for trim strips or other visual effects. One natural way to make use of the groove was to form it with a previously well-known conventional dovetail cross-section, or other comparable well-known retaining cross-section, so that it could hold a complementarily shaped nut slidably captive, and thus provide a slidable attachment for a tie-down. Unfortunately both types of slidable tie-down were incompatible with the snap-in plastic trim strips mentioned earlier. If the tie-downs were connected by means of external tracks, the clamping screws engaged and marred the finish of the trim strips. If the tie-downs were connected by means of shaped nuts which slid in a dovetail or other retaining groove, the trim strip had to be removed to permit sliding of the nuts and tie-downs along the slats.

Elevated crossbars were of course still necessary for certain specialized uses, and it was standard practice to attached these to the slats temporarily by the same of similar sliding elements as used for the tie-downs. This attachment arrangement in general serves a useful purpose, and has found extensive commercial use. However, with the added leverage of the crossbars the clamping mechanisms holding the tie-downs to the slats could work loose, permitting the crossbars to slide along the slats—and this in turn could lead to damage of the retaining nuts, the slats, or even the vehicle top or luggage.

Representative of this generation of carriers are U.S. Pat. Nos. 4,015,760 and 4,099,658, both to Bott, issued in 1977 and 1978 respectively, and 4,132,335, which issued in 1979 to Ingram. Some features of the last two patents mentioned represent efforts to resolve some of the drawbacks mentioned, but because of more solid or more elaborate construction these features are objectionably costly.

In addition, these patents show tie-down attachments—whether fixed to the vehicle or sliding along slats—that project upwardly well above the slats, blocking the tracks. In the case of fixed tie-downs at the ends of the slats, there upward projections prevent the user from moving the sliding-type brackets onto the slats.

Hence the user must make an essentially permanent choice between the convenience of having fixed tie-downs at the ends of the slats and the convenience of being able to install (and remove) the sliding brackets at will.

This choice is particularly annoying in currently popular versions of carriers that have a permanently installed crossbar spanning, usually, the rear ends of the outboard slats. The crossbar attachment blocks the rear ends of those slats, leaving only the other end for installing of sliding tie-down brackets. If that "other" end of an outboard slat is also blocked by an upwardly projecting fixed tie-down, then the user is essentially foreclosed for the life of the carrier from using sliding tiedown brackets on the outboard slat. Yet a fixed tie-down at the very end of the slat is desirable to accommodate very large articles of luggage.

In addition to thus limiting the flexibility of use of slat-type luggage carriers, upwardly projecting fixed tie-downs are also troublesome in that they tend to catch and gouge luggage and even users' hands and elbows.

Another problem of the prior art, already suggested above, is the high cost of solid construction of the slats. On the other hand, formed-metal construction, leaving gaps inside the slats, is too readily damaged at installation. Ordinary reinforcing pads and the like are virtually unusable inside the slats, because they slide out of position—and are hidden so that it is extremely difficult for the installer to determine their position.

OBJECTIVES OF THE INVENTION

The present invention is directed to resolution of the drawbacks outlined above, at moderate expense, in a luggage carrier compatible with modern standards of styling and streamlining.

More particularly, it is an object of the invention to provide a slidable, lockage bracket for use in a vehicle-mounted luggage carrier having a plurality of slats, each slat being formed with external tracks along its opposite edges, which bracket is compatible with decorative trim along the centers of such slats and provides a means of attachment for a tie-down or a crossbar.

Another object of the invention is to provide a luggage-restraining device which, though adapted to prevent luggage from sliding along the slats of such a carrier, is also adapted to assume when not in use a low-profile configuration with respect to such slat, for stylish appearance and minimal wind resistance.

Yet another object of the invention is to provide a system for attachment of a crossbar between a pair of slats of such a carrier, whereby the previously mentioned slidable, lockable bracket provides a means of attachment for the crossbar but attachment is possible only at a very small, limited number of discrete points along the slats—at which points additional provision is made for overcoming the natural tendency of weight applied to the crossbars, acting through the crossbar leverage, to dislodge the bracket locking mechanism.

A further object of the invention is to provide accessories for use in carrying particular items which are cumbersome or awkward to secure to such a vehicle carrier but which it is particularly often desired to carry on a vehicle—such as, for example, a bicycle or skis.

Still another object of the invention is to provide a fixed tie-down member that is available for attachment of straps, ropes and so forth at the very ends of the slats—but permits mounting of a sliding tie-down bracket over those same ends.

Still another object of the invention is to provide a pad-reinforced formed-metal construction that is extremely economical and yet very sturdy, particularly at installation, and nevertheless easy to install.

One yet further object of the invention is to provide in combination all of the components of a vehicle-mounted carrier which implements the several objects enumerated above.

The manner in which my invention implements these objects may be understood and appreciated by reference to the following detailed description and the accompanying drawings, of which:

BRIEF DESCRIPTION OF THE DRAWINGS

FIG. 8 is an isometric elevation, similar to FIG. 1 but showing another preferred embodiment, installed on the top or rear deck of a vehicle.

FIG. 9 is an enlarged view, also isometric, of part of the FIG. 8 embodiment.

FIG. 10 is an even more enlarged view, also isometric, of a particualr component—namely, a "tie-down end-cap"—of the embodiment of FIGS. 8 and 9.

FIG. 11 is a plan view of the FIG. 10 tie-down end-cap.

FIG. 12 is a side elevation of the FIG. 10 end-cap.

FIG. 13 is an enlarge isometric view, similar to FIG. 10, of another type of tie-down end-cap that can be used in place of the FIG. 10 end-cap.

FIG. 14 is a plan view of the FIG. 13 end-cap.

FIG. 15 is a side elevation of the FIG. 13 end-cap.

FIG. 16 is an exploded isometric view, partly broken away for clarity, of particular components—namely, a "crossbar," a "crossbar-stanchion end-cap," a "slat," and a "reinforcing spacer"—of the embodiment of FIGS. 8 and 9.

FIG. 17 is a cross-sectional elevation of certain components shown in FIG. 16—in particular, the slat and reinforcing spacer—together with a "mounting gasket" and a "trim strip."

FIG. 18 is an isometric view of the reinforcing spacer first shown in FIGS. 16 and 17.

FIG. 19 is a bottom plan view, partly broken away, of a slat suitable for use in the embodiments already illustrated—showing locations for reinforcing spacers.

FIG. 20 is an end elevation of an inverted slat and a FIG. 18 reinforcing spacer, showing an intermediate stage in installation of the reinforcing spacer in the slat.

FIG. 21 is a similar end elevation of the inverted slat and spacer, showing the completed installation—together with the gasket also installed on the slat.

FIG. 22 is an isometric view showing another type of ski-rack accessory installed on the luggage carrier of FIGS. 8 and 9 as used on a vehicle rear deck.

FIG. 23 is a side elevation of the FIG. 22 ski-rack accessory, particularly showing the configuration of the invention that provides desired clearances between the vehicle and the skis on the rack.

FIG. 24 is an isometric view showing the embodiment of FIGS. 8 and 9 used to attach luggage to the vehicle.

FIG. 25 is an isometric view similar to FIGS. 9 and 10, but also showing an intermediate stage in the installation, onto a slat, of either of the parts first illustrated in FIG. 2 or 3.

DETAILED DESCRIPTION OF PREFERRED EMBODIMENTS

Generally speaking, the instant invention is a vehicle-mounted multipurpose carrier, taking the form of several modular elements which can be used in various combinations and ways to quickly and easily accommodate a great variety of items to be carried. However, the basic carrier—designed to remain permanently attached to the vehicle—is a low, streamlined structure which harmonizes and cooperates with modern vehicle styling.

Four parallel roll-formed slats attached to a vehicle top or rear deck have external tracks formed along their opposite edges. On each slat is a pair of brackets, which engage the external tracks of the sslat, and are slidable along substantially the whole length of the slat and lockable at any point along the sliding range. The brackets each comprise a housing which engages the external tracks, an intermediate clamping member retained within but movable with respect to the housing, and means for applying force between the housing and the clamping member to press the clamping member against the tracks. This arrangement permits locking the brackets along the slat without marring a plastic trim strip which is retained in a central groove in the slat.

The four brackets which slide along the two inner slats are each provided with hinged end-stops which can be turned up to engage and restrain luggage, or when not in use turned down to closely hug the slats—minimizing wind resistance and presenting a trim appearance.

The brackets which slide along the two outer slats are each provided with tie-downs for use with rope or the like, and in addition are adapted to support special-purpose crossbars spanning the outer slats. These crossbars are attachable to the brackets only when the latter are in certain discrete positions (related to the crossbar functions) where extra resistance to sliding is provided. Special clamps are provided for securing bicycles by their handlebars to one crossbar, with the bicycle seat held against the other crossbar by straps or elastic cord. Another type of crossbar is a ski-rack type, with a keyrleasable ski clamp.

Figure 1:
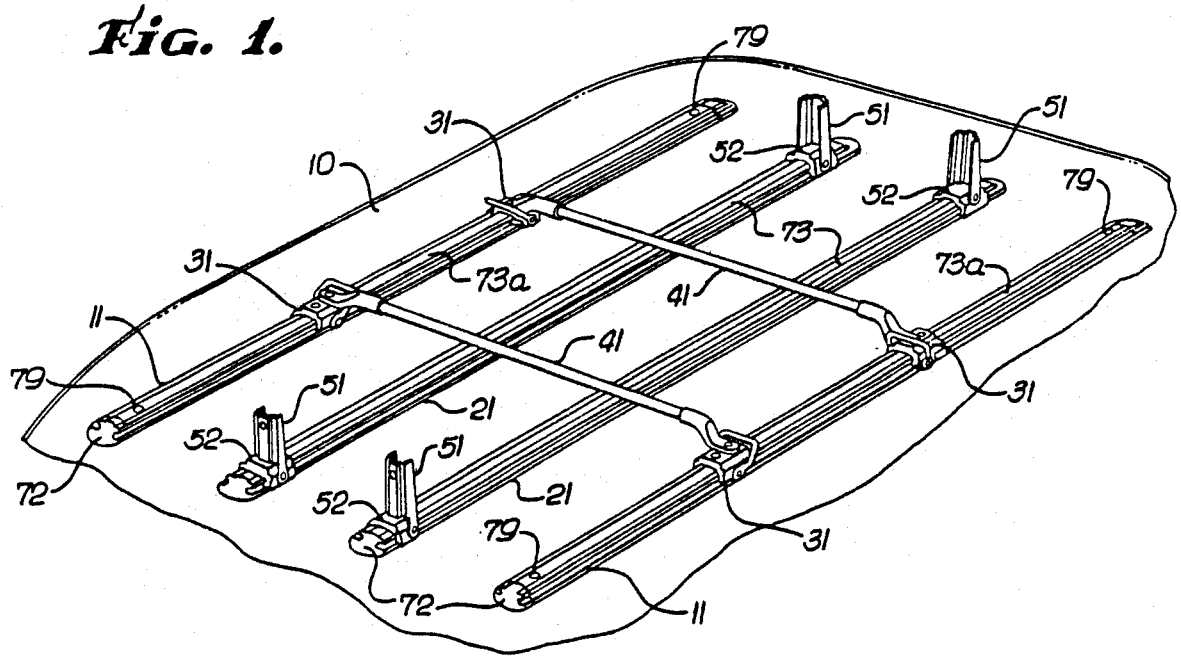
FIG. 1 is an isometric elevation showing a preferred embodiment of the present invention, installed on the top of a vehicle.

The principal modules of a preferred embodiment of the invention appear in FIG. 1.

Two outer or outboard slats 11, mutually parallel, are affixed permanently as by screws or rivets to the top 10 of a vehicle. Two inner or inboard slats 21 are similarly affixed to the vehicle top 10, between and generally parallel to the outer slats 11. The inboard slats 21 may be omitted, or additional ones added, as preferred.

Slidably fastened to each outboard slat 11 are two tie-down brackets 31, which are capable of being moved to any position along the respective slat 11 and locked in that position using an internal clamping mechanism, to be described.

Also fastened to the outboard slats 11, and spanning those slats, are two crossbars 41. The crossbars 41 are optionally and removably attached to the slats 11 by means of the respective brackets 31; however, the slats 11 and attachment means are adapted for this attachment only at a limited number of specific locations along the length of the slats 11. Two of these locations are illustrated in FIG. 1, and two others in FIG. 7. Another application using one of the locations illustrated in FIG. 1 and one of those illustrated in FIG. 7 appears in FIG. 5. Thus there are four positions in which the crossbars 41 can be attached to the slats 11; at these positions, as will be seen, a location reinforcement mechanism is provided, so that the crossbars and any weight placed on them do not depend solely on the bracket-clamping device mentioned earlier to maintain correct positioning of the crossbars along the slats.

The four positions at which crossbar attachment is permitted and position reinforcement is provided are selected for optimum use of certain accessories to be described hereunder, and in the case of the general-purpose crossbars shown in FIG. 1 simply as generally optimum locations for use of those crossbars. The crossbars are readily and quickly installed or removed, so that the tie-down brackets 31 can be positioned, locked, and used without the crossbars 41 at any point along the slats 11.

Slidably fastened to each inboard slat 21 are two end-stops 51, each positionable at any point along the respective slat 21 and lockable at that point using an internal clamping mechanism. In addition each end-stop 51 is adapted to be manually moved between two configurations—(1) one position in which the end-stop is upwardly extending for the purpose of engaging luggage placed upon the slats 21 and/or 11, to prevent such luggage from sliding longitudinally with respect to the slats and vehicle; and (2) a second position in which the end-stop is very low, hugging or recessed within the respective slat, to present a tirm or "tight" appearance and minimum wind resistance.

Figure 2:
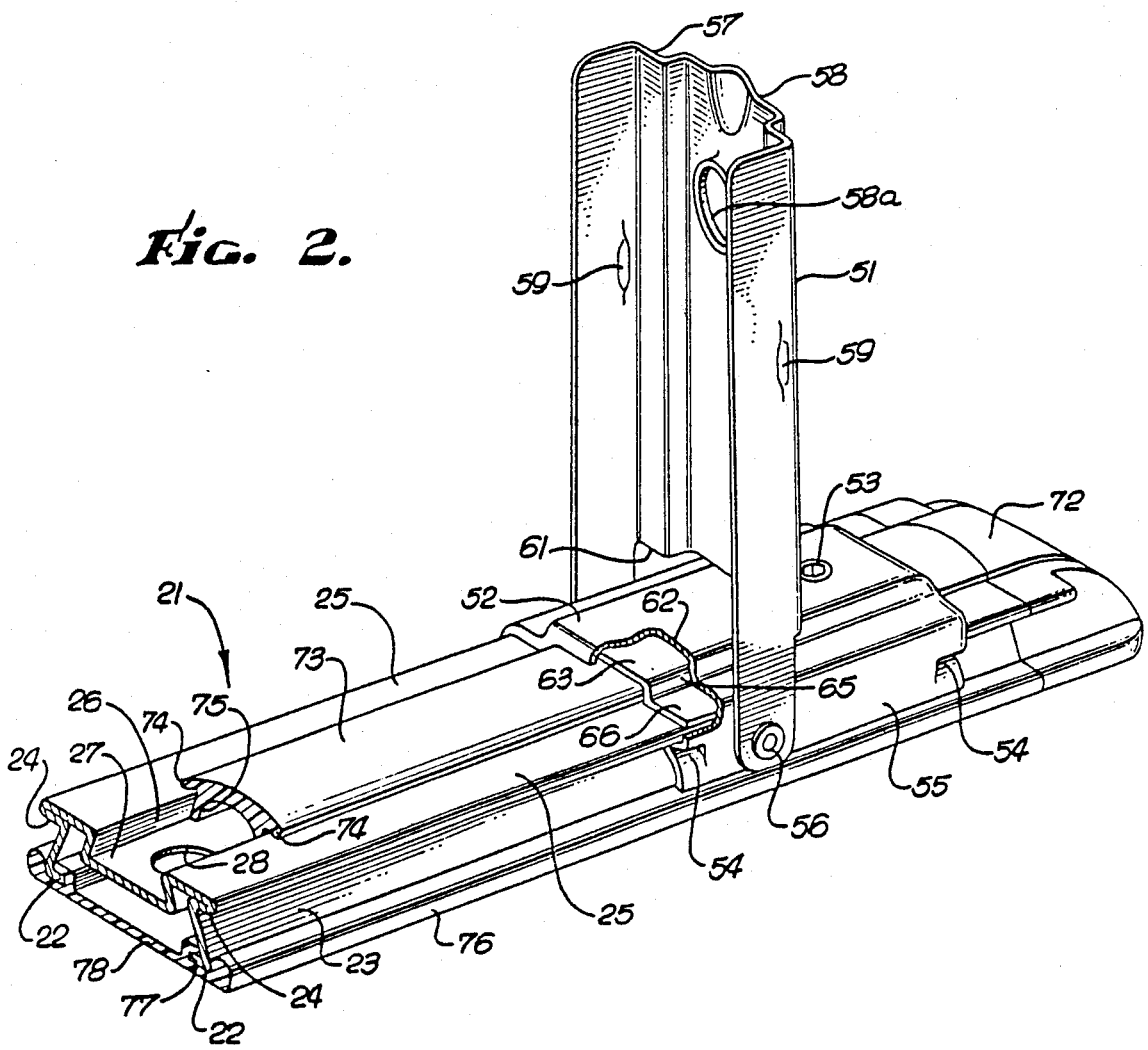
FIG. 2 is an enlarged view, also isometric but partly cut away for clarity, of part of the FIG. 1 embodiment.
Figure 3:
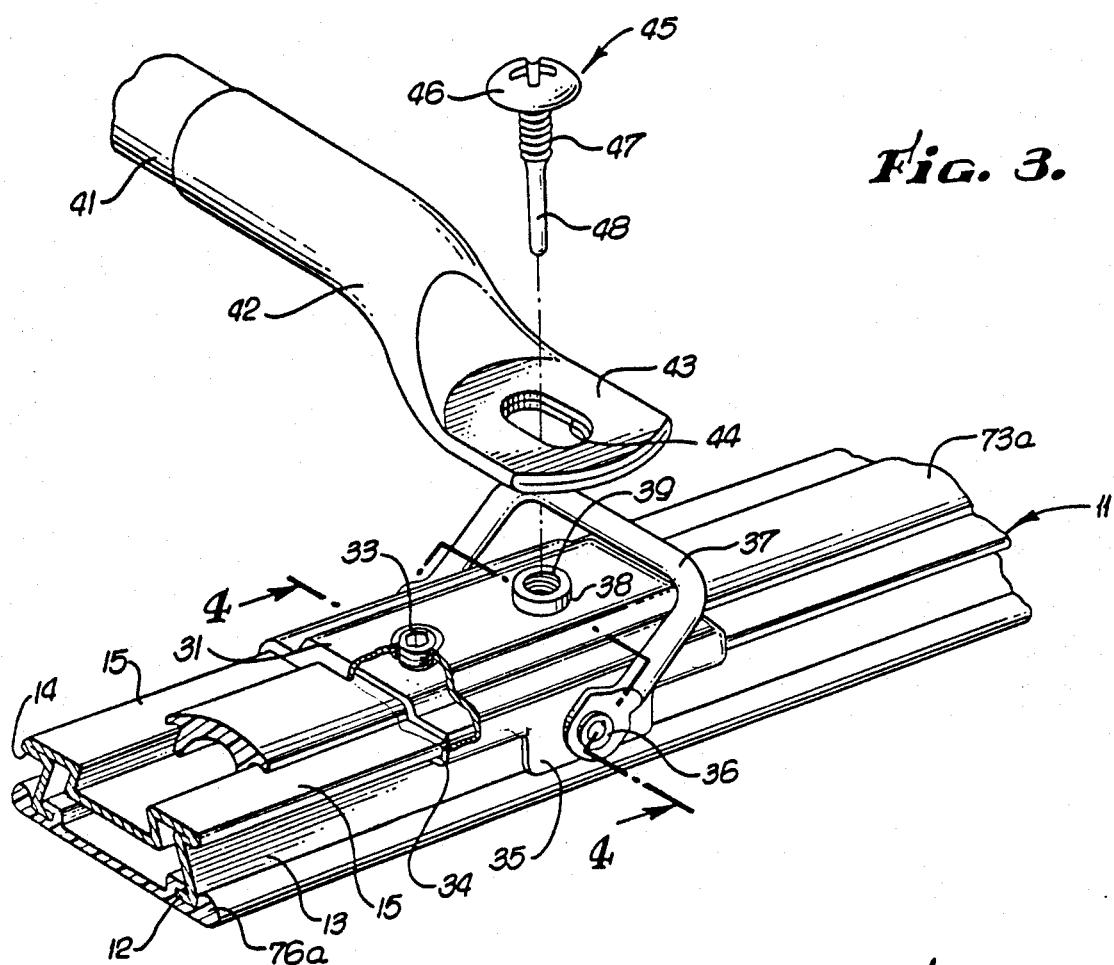
FIG. 3 is a similar enlarged view of another part of the FIG. 1 embodiment.
Figure 4:
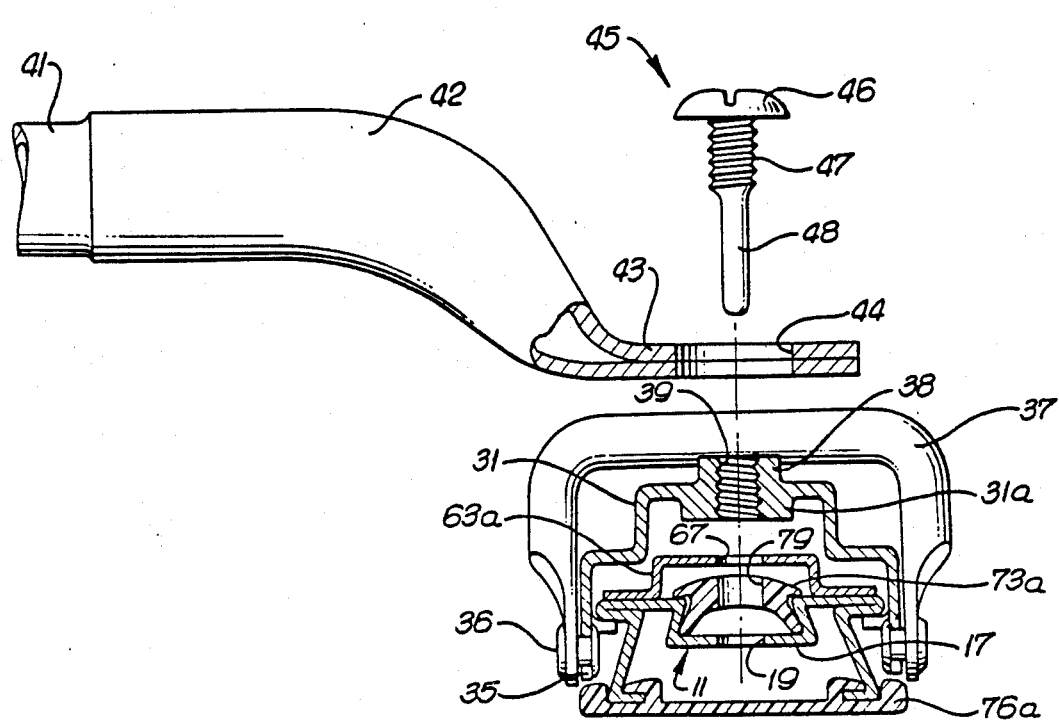
FIG. 4 is an elevation, principal in cross-section, taken along the line 4—4 of FIG. 3.

Some details of the FIG. 1 construction appear more clearly in FIGS. 2 through 4. As shown in FIG. 2 a preferred construction for the slats 21 (and for the outboard slats 11 as well) is roll-formed sheet metal, and in particular comprises two upstanding outer walls 23, two upstanding inner walls 26, two substantially horizontal top supporting surfaces 25 spanning the gap between each outer wall and its adjacent inner wall, and a horizontal 'web' portion 27 connecting the bottom edges of the two inner walls 26. The web portion 27 is recessed relative to the upper surfaces 25, but well above the bottom edges of the outer walls 23. An essential aspect of this embodiment is the flattened outer corner or edge 24 along each side of the roll-formed cell; these flattened portions serve as external gripping surfaces or tracks for slidable attachment of the end-stops 51, as will be seen (and, in the case of the outboard slats 11, for slidable attachment of the tie-down brackets 31). Other features of the slats 21 (and 11) include the inwardly directed rolled edge 22, which helps to preserve the appearance and condition of the metal edge and of the vehicle top 10; and mounting holes such as 28 in the horizontal "web" section 27.

Also helping to preserve appearance and condition of the vehicle top 10 and metal edge is a mounting pad or gasket 76, which has a T-groove section 77 near each outer edge, specially formed to receive the rolled-in edge 22 of outer wall 23. The mounting pad also has a continuous flat web section 78, connecting and stabilizing the T-groove sections. It will be noted that the web section 78 of gasket 76 is flat and shallow, and does not engage the underside of the corresponding metal web section 27; thus any weight placed upon the slat 21 (or 11) is supported entirely by the outer walls 23, the inner walls 26 contributing no support.

Additional plastic trim features are end-cap 72 and trim strip 73. The end-cap 72 may be made in such a way that it blocks the end of the track 24, so that the end-stop 51 (or brackets 31) cannot be slid off the end of the slat. I prefer, however, to make the end-cap 72 so that the end-stop 51 (or brackets 31) can run off the end of the slat for storage: this reduces weathering of the components, preserves the clean lines of the vehicle, and avoids injury to users' hands and damage to articles brought near. The trim strip 73 is a snap-in type, with lips 74 extending beyond the central groove formed by walls 26 and web 27, and retaining protrusions 75 which extend into that groove and exert light retaining pressure against the walls 26.

The end-stop 51 is slidably secured to the slat 21 by means of a sliding bracket 52 which as shown is contoured to clear the trim strip 73 but closely surround, as by inwardly dented portions 54 of downward extensions 55 on each side, the external tracks 24. The end-stop 51 is hinged to the sliding bracket 52 as by rivets 56 on each side, secured to the downward extensions or ears 55 on each side of the bracket 52. This pivoting attachment permits the end-stop 51 to be manually swung down (counterclockwise in FIG. 2) to a position just above and closely hugging the slat 21. For this purpose the end-stop 51 is contoured as at 58 to clear the trim strip 73 when the end-stop 51 is in lowered position; and is swaged or dimpled as at 59 to provide a "snap-action" detent, holding the end-stop firmly against the slat 21 and thus avoiding rattles. The end-stop is cut in as at 61 to exactly the proper distance from the pivot 56, taking into account the height of the bracket 52 above the rivet 56 position, so that the end-stop 51 when hinged upward will stand substantially vertical. The pivot 56 must be at a suitable distance from the end of the bracket (the left end, as drawn in FIG. 2) so that when the end-stop 51 is lowered against the slat 21 the cut-in edge 61 clears the bracket 52—but only by a slight distance, so that an unsightly gap is avoided.

While a preferred embodiment as described above involves a hinge action to accomplish extension and retraction of the end-stop 51 with respect to the bracket 52, other mechanisms for extension and retraction—such as, merely for example, telescopings structures, folding structures, or screw structures—are also workable and within the scope of certain of the appended claims.

The end-stop 51 and its sliding bracket 52 may be locked against the tracks 24 by means of an internal clamping mechanism, mentioned earlier. This mechanism consists of an intermediate clamping plate, visible in FIG. 2 where the bracket 52 housing is cut away at 62, and a set-screw 53 which is recessed within the housing 52. The intermediate clamping plate has two lower edges 66 which engage the upper surfaces 25 of the tracks 24, two generally vertical sections 65 permitting clearance of the trim strip 73, and one generally horizontal intermediate section 63 which is depressed by set-screw 53 when the latter is screwed down into the bracket housing 52. If preferred, the intermediate clamping plate could engage the track surface 25 on only one side of the slat 21, the other edge of the clamping plate being supported internally within the bracket 52.

The foregoing description of the end-stop brackets 52 applies equally well to the tie-down brackets 31 shown in FIGS. 3 and 4, except that, of course, there is no end-stop 51; hinged to each tie-down bracket 31 there is instead a tie-down loop or eye 37, or if preferred a hook or other structure through or about which a rope or the like may be tied, strung or otherwise fastened. Downward extensions 35 may as shown be shorter longitudinally than the extensions 55 of FIG. 2. The pivot attachment 36 is by a rivet the like through downward extension or ear 35, and the bracket 31 is contoured to clear the trim strip 73a and closely surround, as by an inwardly angled bottom edge 35 on each side, the external tracks 14 of slat 11. The slat 11 is identical to the slat 21 previously described, except for certain essential locating holes to be mentioned shortly, and is provided with identical plastic end-caps (not shown) and mounting pad 76a—engaging inwardly rolled bottom edge 12 of the slat 11.

However, there are certain essential differences in the tie-down bracket 31, relative to the end-stop bracket 52. These differences relate to the attachment of crossbars 41:

Upstanding pillar 38, which is integral with the bracket housing 31, provides an anchor point for the crossbar 41. The downward termination 42 of the crossbar 41 comprises a flattened horizontal section 43 adapted to engage the flat horizontal top surface of the bracket 31, while the hole 44 in the horizontal section 43 engages the pillar 38. Pillar 38 is not essential, as screw 45 adequately secures the cross bar 41. The underside of the bracket housing 31 carries a downward extending enlargement 31a below and surrounding the area of the base of the pillar 38. The enlargement 31a adds strength to the structural attachment of the pillar 38, so that force applied to the pillar via the crossbar 41, 42 does not deform or otherwise damage the bracket 31 or attached pillar. A threaded hole 39 passes vertically through the pillar 38, bracket housing 31 and enlargement 31a, accommodating special screw 45 which secures the crossbar to the bracket. The screw 45 has a screwdriver head 46, threads 47 which mate with those of hole 39, and a turned-down (that is to say, smaller-diameter) extension 48 which after installation extends downward beyond the bottom surface of enlargement 31a. The extension 48, when the screw 45 is threaded fully into the mating hole 39, passes through circular holes or short slots 67 in the clamping plate 63a, 79 in the trim strip 73a, and 19 in web portion 17 of roll-formed slat 11. Clamping plate 63a, trimstrip 73a, and web 17 are identical to the corresponding elements 63, 73 and 27 of FIG. 2, with the exception of the respective circular holes or slots 67, 79 and 19. When crossbar 41 is to be attached, tie-down 37 is readily pivoted out of the way to either the right (as drawn in FIG. 3) or left of the pillar 38, to clear the crossbar. The extension 48 interacts with the holes or slots 67, 79 and 19 to permit crossbar attachment only at the particular locations along the slats where the holes are provided; and at those particular locations provide reinforced positioning along the slat, not solely dependent upon the clamping action previously described. This arrangement tends to prevent the bracket 31 from being loosened and slid along the slat 11 by weight or other forces applied to the crossbar 41 and through the leverage of the downward termination 42. The holes or slots also help a user to find quickly the locations along the slat appropriate for the various types of crossbars.

Figure 5:
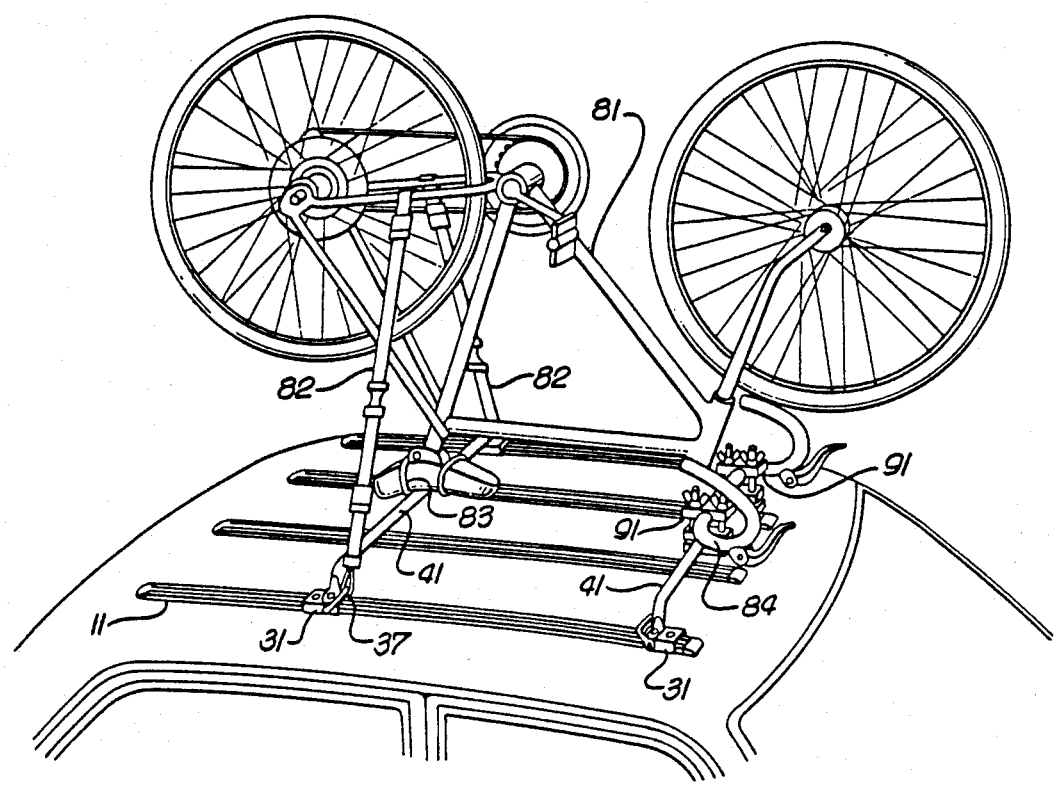
FIG. 5 is an isometric view of the preferred embodiment of FIG. 1 in use with an accessory which facilitates carrying of a bicycle.

For example, the general-purpose crossbars 41 when used to help secure or support miscellaneous luggage may be placed at the two intermediate locations along the slat illustrated in FIG. 1. The spacing of these locations among the slats in terms of fractions of the slat lengths, or in terms of absolute distances, of course varies with the overall slat lengths and in turn the size of the vehicle surface on which the slats are installed; however, as suggested in FIG. 1 the crossbar attachment points for a relatively large vehicle may be spaced inwardly from the slat ends roughly 30% of the slat length. This spacing is also suitable for use with the bicycle-mounting module shown in FIGS. 5 and 6. Additional crossbar attachment points are provided at the extreme ends of the slat. On a smaller vehicle, as indicated in FIG. 5, it may generally be more appropriate to provide only three crossbar attachment points— one at each end, and one 35% or 40% forward from the rear end. This intermediate attachment in combination with the front end attachment will accommodate a standard bicycle, as illustrated in FIG. 5. For the ski-rack module, as shown in FIG. 7, for almost all autos except station wagons the extreme end locations are most appropriate.

Figure 6:
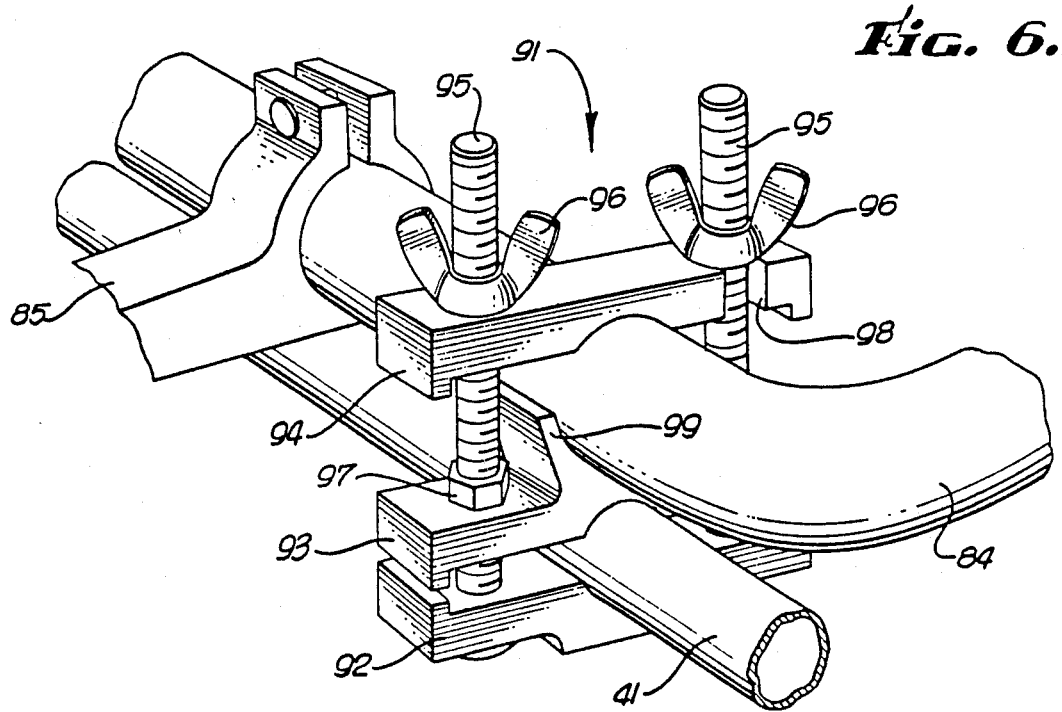
FIG. 6 is an enlarged view of part of the accessory shown in FIG. 5.

As shown in FIGS. 5 and 6, the bicycle-mounting module consists of the standard outboard slats 11 (the inboard slats not being used, but of course remaining on the vehicle), four tie-down brackets 31, two crossbars 41, two special clamps 91, a pair of stabilizing straps 82 and an elastic cord, sometimes called a "bungy cord," 83. As illustrated a bicycle 81 is positioned upside-down above the vehicle, with the bicycle seat above one of the crossbars 41 and the handlebars 84 above the other crossbar 41. Each of the two clamps 91 is actually a dual-function device, the lower two jaws 92 and 93 being secured to the crossbar 41 and the upper two jaws 93 (through its upward extension 99) and 94 firmly gripping the handlebar 84.

The three jaws 92, 93 and 94 are held together by a pair of bolts 95, the lower two jaws 92 and 93 being held to the crossbar by nuts 97, in cooperation with bolts 95, and the upper jaw 94 being drawn toward the lower two by the action of wing nuts 96. The two bolts 95 pass through holes in the three jaws 92, 93 and 94; one of these holes in the upper jaw 94 is opened outward to one side of the jaw 94 to form a slot 98. This construction permits the upper jaw 94 to be swung out of the way of the handlebar 84 after the wing nuts 96 have been backed only partway up the bolts 95, rather then requiring complete removal of the wing nuts and upper jaw to place the bicycle on the rack or remove it from the rack. The bungy cord 83 holds the seat to the crossbar 41 upon which it rests, and the straps 82 stabilize the bicycle laterally by attachment between the bicycle frame and the tie-down loops 37 on the outboard brackets 31.

Figure 7:
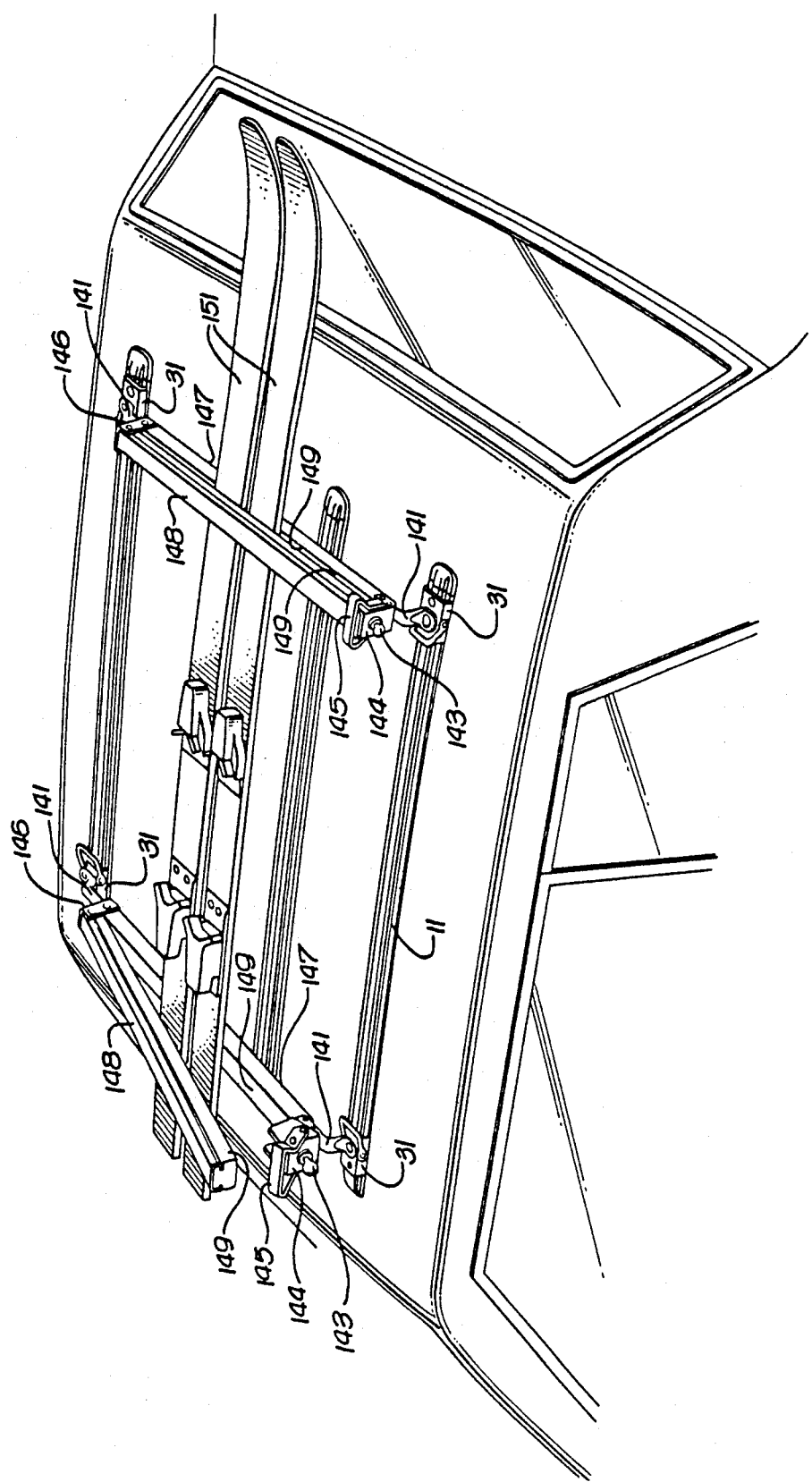
FIG. 7 is an isometric view of the preferred embodiment of FIG. 1, but with part of that preferred embodiment removed and replaced by an accessory which facilitates carrying skis.

The ski-rack module, illustrated in FIG. 7, comprises two substantially identical special-purpose crossbars 141, mounted to the outboard slats 11 and tie-down brackets 31 as previously described for the general-purpose crossbars 41 of FIGS. 1 and 3 through 6. Attached to each crossbar 141 is a ski mount capable of holding and securing a plurality of skis, and comprising a lower bar 147 attached firmly to the crossbar 141, a vertical hinge or pivot 146 secured to one end of the lower bar 147, an upper bar 148 attached at one end to the hinge 146, a pair of compliant pads 149 disposed along the mutually facing sides of the bars 144 and 148, and a locking mechanism at the end of the bars opposite the end where the hinge 146 is.

The locking mechanism may take various forms, one favored embodiment as illustrated comprising a hasp 145 which when in an upper position (as shown at the left in FIG. 7) blocks the upper bar 148 from pivoting vertically in or out of its horizontal position, parallel to the lower bar 147. The hasp 145 may be swung outward (as shown at the right end of FIG. 7) to permit the upper bar 148 to move in and out of the horizontal position. In the preferred embodiment shown, the hasp can be held in its inward position or released by a security lock, contained within lock housing 144 and controlled by a key 143. When the upper bar is moved to its horizontal position, parallel to the lower bar, and secured by the hasp, if firmly but compliantly retains up to six skis side by side, though only two skis 141 are illustrated.

The embodiment of my invention shown in FIG. 8 is particularly useful for an automobile rear deck. It can, however, be used on the top too—or on any other generally planar surface of the vehicle.

This embodiment is particularly good for rear-deck use in that many such decks are somewhat inclined to the horizontal, usually lower toward the rear of the vehicle, and this embodiment includes at the rear a permanently installed crossbar assembly 241, 242 to deter articles from sliding down the incline and off the back of the vehicle.

As previously mentioned, such crossbar assemblies can introduce an annoying inconvenience in installation of *sliding brackets*—such as tie-down brackets 31 and end-stop brackets 51 (FIGS. 1 through 5, and 7). In this embodiment, that inconvenience is eliminated.

In the FIG. 8 embodiment, the slats 211 are secured to the vehicle surface 210 in conjunction with special end-caps 272 and crossbar-stanchion end-caps 242. The slats 211 themselves are essentially the same as the slats 11 shown in FIGS. 1 through 5, and 7; and in the top of each slat 211 is a trim strip 273a that is perforated at selected locations for passage of the screw extension 48 (FIG. 4). A gasket 276a is secured to the underportion of each slat 211 for protection of the vehicle surface 210.

To permit separate storage of the tie-down and end-stop brackets 31 and 51, each end-cap 272 is shaped to continue the cross-sectional contour of the associated slat 211. More precisely, each end-cap 272, like the preferred end-caps 72 of the previously described embodiment, continues the *combined* cross-section of the slat 211 with its trim strip 273a and gasket 276a. When the end-caps 272 are made in this way, the tie-down and end-stop brackets 31 and 51 can be slid on and off the ends of the slats 211.

In addition—as more clearly shown in FIGS. 9 ff—. the end-caps 272 have tie-down arches 348. Although contained within the cross-section or "envelope" of the slats 211, these arches 348 are strong and define ample holes 349 for attachment of luggage-constraining means such as bungy cords, ropes, or small straps. I will accordingly refer to the end-caps 272 as "tie-down end-caps."

Each tie-down end-cap 272 includes a tongue 343 that fits into the open end of the mating slat 211. A vertical holes 344 is defined through the center of the tongue portion 343 for passage of a mounting screw (similar to the mounting screw 332 in FIG. 16) that secures the end-cap 272 and slat 211 together to the vehicle surface 210.

The tongue has a relatively narrow lower body 352 that fits loosely between the two inwardly rolled bottom edges 212 (see FIGS. 16 and 17) of the slat 211. This lower body 352 also fits between the two inner ridges 276b (see FIG. 17) of the deck-protecting gasket 276a, and so rests squarely upon the central web of the gasket 276a.

The tongue also has a slightly wider flanged portion 351 (FIGS. 10 through 12) that fits loosely between the walls 213 (see FIGS. 16 and 17) of the slat 211.

Abutting and integral with the tongues 343, the end-cap 272 continues in a generally upstanding wall portion 346 and, unitary with the bottom of this wall 346, a floor portion 347 that extends away from the tongue 343. After installation, the floor 347 of the end-cap 272 lies atop the vehicle surface 210.

Each tie-down arch 348 interconnects the top of the wall 346 with the remote end (that is, remote from the tongue 343) of the floor 347, spanning a hole 349. To facilitate attachment of bungy cords, ropes, etc., I prefer to provide two separate relatively narrow tie-down arches 348, separated by a gap in which the unobstructed wall 346 and floor 347 are exposed. The arches 348 are preferably wide near the bottom (i. e., near the floor portion 347) and relatively narrow near the top (i. e., near the wall 346), to provide good strength while smoothly matching the combined cross-section of the mating slat, trim strip and gasket.

Thus the tops of the arches 348 do not interfere with an upper bulging surface 345 of the wall 346. The bulging contour 345 of the wall 346 is provided to match approximately the upwardly bulging contour of the trim strip 273a. The arches 348 and the wall 346 are sized and shaped so that, after installation on the vehicle, the arches generally blend visually and functionally into the top surfaces 215 of the mating slat 211.

To complete this visual and functional effect, the upper corners of the wall 346 carry small "ears" or "wings" 341 that form, after installation, smooth terminations for the sharply cut-off outer edges 214/215 of the slat flanges or tracks 213, 215. Likewise the bottom corners of the wall 346 carry small "feet" 353 that form, after installation, smooth terminations for the cut-off ends of the deck-protecting gasket 276a.

To provide a strong tie-down attachment configuration that is not damaged in repetitive connection and disconnection of cords, ropes, etc., the relatively thin and fragile "ears" 341 are not continued above the holes 349—that is to say, the ears 341 do not extend beyond the wall 346. Nevertheless as will be-appreciated the outer, upper corners of the arches 348 do help to guide the underportions of the sliding brackets 31, 51 into position to engage the ears 341 and flanges 214/215. This guiding function helps a user to install and remove the sliding brackets 31 and 51 quickly and with minimum likelihood of damaging the ears 341 or of "catching" and injuring the user's fingers.

By virtue of the end-cap configuration described above, the sliding brackets 33 (and 53) move smoothly on and off the combined slats 211 and end-caps 343—as best shown in FIG. 25—with a simple sliding motion represented in that drawing by a double-headed arrow 500.

The tie-down end-cap is advantageously molded in one piece from very tough, strong high-impact plastic. The crossbar-stanchion end-cap and reinforcing spacer are preferably made of the same or similar material. To avoid shrinkage in molding, the bottoms of bulky portions—such as the tongue body 243, the wall 346 and the lower ends of the arches 348—are advantageously hollow.

Another type of tie-down end-cap appears in FIGS. 13 through 15. This end-cap, like the preferred type of FIGS. 8 through 12, has a tongue 443 with lower body 452 and upper flange 451, and abutting the tongue an upstanding wall portion 446, floor portion 447, ears 441 and feet 453.

This type of end-cap, however, has just one tie-down arch 448, defining only one hole 449, and has more abruptly terminated vertical surfaces of the wall 446 which tend to catch luggage and users' hands—perhaps bearing some slightly greater risk of damage and injury. Furthermore, this type of tie-down end-cap does not effectively guide the sliding brackets 31 and 51 into position to engage the track flanges 214/215.

Consequently, while this type of tie-down end-cap is novel and serviceable, I regard the type in FIGS. 8 through 12 as a considerably advanced improvement over this one.

As shown in FIG. 16, the crossbar in my luggage carrier is attached by a stanchion end-cap 242 that is compatible with the tie-down end-caps 272 and 372. The crossbar-stanchion end-cap 242 is a unitary molded article with a tongue 243 generally identical to the tongues 343, 443 of the respective tie-down end-caps. The crossbar-stanchion end-cap 242 also has a bottom lip that forms the extension of the gasket 276a (FIGS. 1 and 17).

In addition the crossbar-stanchion end-cap 242 has ears 339 that terminate the slat flanges 214/215 for appearance's sake, and to avoid injury and damage due to the sharp metal edges. As will be apparent, however, in this case the ears 339 do not function as extensions of the tracks for purposes of retaining the sliding brackets 31, 51—since those brackets do not slide off the slats at the ends where the crossbar-stanchion end-caps 242 are.

Abutting and integral with the tongue 243 of the crossbar-stanchion end-cap is a base or pedestal 311, from which rise a crossbar stanchion 312. A slot 313 in the stanchion offers an additional tie point for straps, etc.

At the bottom of the slot 313 a hole 267 is defined through the pedestal 311. This hole 267 is a clearance hole for an auxiliary mounting screw 233 that secures the remote end of the pedestal 311 to the vehicle body—augmenting the attachment provided by the main mounting screw 332. The auxiliary mounting screw 233 is necessary to hold down the remote end of the pedestal 311 because of the length of the pedestal 311, in conjunction with the additional forces often introduced by virtue of the leverage effect of the crossbar stanchion 312.

The tongue 243 fits within the open end 331 (FIG. 16) of the slat 211, as previously described for the tongue 343 of the tie-down end-cap 272. In both cases the mounting hole 228 in the central web portion 217 is surrounded by a downwardly bent annular surface 228' of the sheet metal, serving as a frustoconical countersink for the mounting screw 332. This countersink frustum 228' projects downwardly into the hole 244 in the tongue 243, while the surrounding web portions 217 of the slat 211 is supported firmly atop the tongue 243.

These relationships aid in alignment and provide added stability for attachment of the crossbar-stanchion end-cap 272 and slat 211 together to the vehicle surface 210. In particular, even if the mounting screw 332 is overtightened the tongue 243 prevents collapse of the rolled sheet-metal structure into its own cavity 331.

The crossbar 241 itself—shown cut away at 324 in FIG. 16—preferably has a strong but aerodynamic (and stylish) teardrop or "wing" cross-section. That shape is matched by a substantially horizontal short mating segment 318 near the upper end of the crossbar stanchion. Projecting horizontally from that shaft segment 318 is an extension 315, of smaller cross-section, which fits within a closely mating cavity 321 in the end of the crossbar 241.

Proper orientation and additional strength of attachment between the crossbar 241 and stanchion 312 are provided by a broad, shallow key 317 formed in the upper surface of the extension 315. The key engages a complementarily shaped keyway 322 in the top of the cavity 321.

A threaded metal bushing 316 is embedded in a vertical hole defined through the extension 315, and a clearance hole 323 is defined through only the bottom half of the crossbar 241, communicating with the end cavity 321. A short machine screw 314 is passed through the clearance hole 323 and threaded into the bushing 316 in the extension 315, to complete attachment of the crossbar 241 to the stanchion end-cap 242.

In FIG. 16 the slat 211 is broken away and an intervening length removed at 333 to show that additional mounting holes 228 (and screws) are spaced along the length of the slat 211 to secure the slat firmly to the vehicle body 210 (also see FIG. 20). Use of these additional mounting points is subject to problems mentioned earlier: without reinforcement the slat tends to deform and collapse into its own internal volume upon overtightening of the mounting screws; therefore reinforcement is desirable.

Unfortunately, however, reinforcing pads tend to slide out of place and become "lost" inside the slat, especially when a deck-protecting gasket is in place, obscuring the view of the inside of the slat by a person attempting to install the slat on a vehicle surface. Prior solutions to this problem have tended to be inordinately expensive and thus impractical.

It is important that luggage carriers of this type be amenable to installation by nonspecializing or even semiskilled personnel, using simple tools. It is also important that the installers be able to consistently "get it right the first time," since mistakes often implicate damage to the vehicle body.

The present invention includes provision of a renforcing spacer 372 (FIGS. 16 through 18, 20 and 21). The principal function of this spacer is to support the web portion 217 that forms the center of the slat 211. The spacer 372 is made, however, in such a way that it is very easily installed inside the slat 211 at the proper position -- aligned with a mounting hole 228—and will stay there reliably after the deck-protecting gasket 276a is attached to the slat 211.

The spacer 372 has a relatively narrow lower body 373 that fits between the inwardly rolled bottom edges 212 of the slat 211, and indeed between the inner ridges 276b of the gasket 276a. Thus the spacer 372 rests solidly and stably upon the central web of the gasket 276a (as do the tongues 343, 443, 243 of the end-caps). Defined through the body 381 of the spacer 372 is a vertical hole 377, into which projects the countersink frustum 228' of the mounting hole 228—to aid in locating the spacer at the hole.

The spacer 372 also has two upstanding arms 374, with generally horizontal top surfaces 382 but inclined inner walls 383. The corner edges 381 between these top surfaces 382 and the inclined inner walls 383 are preferably beveled or rounded. As shown in FIGS. 16, 17, 20 and 21, the arms 374 of the spacer 372 engage and capture the downwardly projecting web portion 217, gripping the *outer* surfaces of the angled inner walls 216 that form the trim-strip slot fo the slat 211.

The spacer 372 cannot be slid into the position shown in the drawings, since the countersink frustum projects downwardly into the hole 377 in the spacer and prevents longitudinal motion. Therefore I provide a spacer 372 that can be snapped into place. This is done, as illustrated in FIG. 20, by;

(1) lowering one of the arms 374 into the space between the inner and outer slat walls 216 and 213—with the hole 377 in the spacer aligned over the countersink frustum 228' in the slat—and then (2) pressing downwardly as at 385 on the undersurface 375 of the inverted spacer 372.

I prefer to make the spacer 372 substantially more rigid than the slat 211, relying upon very slight temporary deformation of the rolled metal of the slat to permit movement of the spacer past the inteference position (not illustrated) into the installed position shown in FIG. 21. When the spacer 372 is thus in position within the slat 211, the gasket 276a is slid into place along the length of the slat 211, starting from either end.

The spacer 372 will remain locked in that position during installation of the gasket, and during other normal handling before attachment of the assembly to the vehicle—but if desired it can be forcibly pried out with moderate finger pressure.

(In FIG. 17 for simplicity of the drawing there is shown in the gasket 276b a hole 376 of the same size as the hole 377 in the spacer 372. In actually the hole in the gasket will be made in the course of installing self-tapping sheet-metal screws such as 332, FIG. 16, and consequently will be irregular and smaller than the hole in the spacer.)

To facilitate longitudinal alignment of the prepunched trim strip 273a with the slat 211, the holes 219 provided in the slat 211 to receive the screw extension 48 are preferably elongated as shown in FIG. 20.

Various features of my invention may be used to particular advantage in combination, as suggested in FIG. 24. That drawing shows just one possible combination of advantageous interactions of the tie-down end-caps 272 with the rear crossbar 241, the sliding tie-down brackets 31 and the sliding end-stop brackets 51.

As shown in FIG. 24 a heavy piece of luggage such as a suitcase 601 may be firmly set against the rear crossbar 241 so that the crossbar stanchions 312 block the luggage 601 from lateral sliding. Forward sliding can be effectively precluded by a pair of end-stop brackets 51 specially positioned in contact with the front of the suitcase 601.

These end-stop brackets 51 can be positioned on the outermost of the slats 211 that are far enough apart to effectively block the suitcase 601. The case can be secured vertically by straps, ropes or bungy cords 602 that are secured between (1) the slots 313 in the stanchions 312 and (2) the tie-down holes 58a in the end-stop brackets 51.

Another piece of luggage such as a duffel bag 603 can rest on the carrier slats 211 in front of the end-stop brackets 51, between those brackets 51 and the tie-down end caps 272 at the very front ends of the slats 211. Straps, ropes or bungy cords 604 may be strung—passing over the duffel bag 603—between the tie-down holes 58a in the end-stop brackets 51 and the tie-down end-caps 272.

It should be noted that these particular cords 604 are fastened between two pairs of tie-down points—one (the end-caps 272) permanent, one (the end-stops brackets 58a) temporary—on the *same slats*. As mentioned earlier, this mode of use is made possible by my new tie-down end-caps 272.

Since the duffel bag 603 in this example extends nearly to the front ends of the slats 211, there might not be adequate room from additional sliding tie-down or end-stop brackets 31 or 51 in front of the bag 603. In any event such additional brackets would be superfluous.

Even if the luggage 603 extended slightly *beyond* the front ends of the slats 211, the tie-down end-caps 272 would serve effectively to secure the cords 604 very strongly to the vehicle body 210. Still they would present minimum likelihood of damage to the luggage 603 or injury to the hands of users. It also may be recalled that in the situation illustrated these tie-down end-caps 272 have already allowed pasage of the end-stop brackets 51.

To secure the duffel bag 603 laterally, another strap, rope or bungy cord 605 may be strung over the bag 603 between two of the sliding tie-down brackets 31—that are specially positioned just at the center of the bag 603, on the two outboard slats 211. These sliding brackets 31 too have been moved onto the outboard slats 211 by passing them over the tie-down end-caps 272 on those slats as shown in FIG. 25.

If these sliding brackets 31 were not needed for this second article of luggage 603, they could be omitted. If, on the other hand, more than one were required, additional sliding tie-down brackets 31 could be readily moved into position over the tie-down end-caps 272 and onto the outboard slats 211.

Nevertheless the tie-down end-caps 272 would remain available for *tie-down* use in any of such combinations.

When the back-deck form of my invention is used to carry skis, my movable-crossbar ski clamps (FIG. 7) may be specially refined as in FIGS. 22 and 23, to ensure that the skis 551 will clear the top 510T of the vehicle, the rear edge of the back deck 510R of the vehicle, and the permanent rear crossbar 241 of the luggage carrier itself.

If desired for convenience, the Allen-wrench set-screws 33 (FIG. 3) used to clamp the sliding tie-down brackets to the slats, may be replaced by knurled thumb-screws or wing-nuts 533.

It is intended to be understood that the foregoing discussion of preferred embodiments is offered only by way of example, and not intended to be interpreted as limiting the scope of the invention—which scope is defined by the appended claims.

I claim:

1. A luggage carrier adapted for substantially permanent attachment to a vehicle, and for use with luggage-constraining straps or the like; and for use with brackets adapted to be moved along the carrier and having means for attachment of such straps or the like; said carrier comprising:

a plurality of slats adapted for mutually parallel, side-by-side, substantially permanent attachment to and upon such vehicle; each slat having an effective height above the vehicle when the slat is attached to the vehicle, and having two ends and two generally upstanding sides, and having on each side an outward laterally projecting flange; the flanges being adapted to engage such a bracket to retain such bracket on the slat while permitting such bracket to move along the slat and on or off at least one end of the slat; and at at least one end of each slat, a separate member which:

is adapted for substantially permanent attachment to and upon such vehicle, is fixed to the slat when the slat and the separate member are attached to the vehicle, has means for attachment of such straps or the like, and extends no further above the vehicle, when attached thereto, than said effective height of the slat;

such a bracket being movable on or off the end of the slat where the separate member is, unimpeded by the separate member;

whereby a user can select use of the luggage carrier without such a bracket, and if such bracket is on the carrier a user can remove such bracket for storage by moving it off the end of the slat where the separate member is, and can constrain such luggage to the carrier by such straps or the like attached to the separate-member strap-attachment means; and a user can select use of the luggage carrier with such a bracket, and if such bracket is not on the carrier a user can install such bracket for use by moving it on over the end of the slat where the separate member is, and can constrain such luggage to the carrier by such straps or the like attached to such bracket strap-attachment means.

2. A luggage carrier adapted for substantially permanent attachment to a vehicle, and for use with luggage-constraining straps or the like; and for use with brackets adapted to be moved along the carrier and having means for attachment of such straps or the like; said carrier comprising:

a plurality of slats adapted for mutually parallel, side-by-side, substantially permanent attachment to and upon such vehicle; each slat having an effective height above the vehicle when the slat is attached to the vehicle, and having two ends and two generally upstanding side, and having on each side a laterally projecting flange; the flanges being adapted to engage such a bracket to retain such bracket on the slat while permitting such bracket to move along the slat and on or off at least one end of the slat;

each slat defining an upper groove that receives and retains a trim strip which extends above the slat; and the effective height of the slat including the extension of the trim strip above the slat; and at at least one end of each slat, a separate member which;

is adapted for substantially permanent attachment to and upon such vehicle, is fixed to the slat when the slat and the separate member are attached to the vehicle, has means for attachment of such straps or the like, and extends no further above the vehicle, when attached thereto, than said effective height of the slat;

such a bracket being movable on or off the end of the slat where the separate member is, unimpeded by the separate member;

whereby a user can select use of the luggage carrier without such a bracket, and if such bracket is on the carrier a user can remove such bracket for storage by moving it off the end of the slat where the separate member is, and can constrain such luggage to the carrier by such straps or the like attached to the separate-member strap-attachment means; and a user can select use of the luggage carrier with such a bracket, and if such bracket is not on the carrier a user can install such bracket for use by moving it on over the end of the slat where the separate member is, and can constrain such luggage to the carrier by such straps or the like attached to such bracket strap-attachment means.

3. The luggage carrier of claim 1, wherein:

each slat has an associated gasket that, in use, rests directly upon such vehicle body, and that has a thickness; and the effective height of the slat includes the thickness of the gasket.

4. A luggage carrier adapted for substantially permanent attachment to a vehicle, and for use with luggage-constraining straps or the like; and for use with brackets adapted to be moved along the carrier and having means for attachment of such straps or the like; said carrier comprising:

a plurality of slats adapted for mutually parallel, side-by-side, substantially permanent attachment to and upon such vehicle; each slat having an effective height above the vehicle when the slat is attached to the vehicle, and having two ends and two generally upstanding sides, and having on each side a laterally projecting flange; the flanges being adapted to engage such a bracket to retain such bracket on the slat while permitting such bracket to move along the slat and on or off at least one end of the slat; and at at least one end of each slat, a separate member which:

is adapted for substantially permanent attachment to and upon such vehicle, is fixed to the slat when the slat and the separate member are attached to the vehicle, has means for attachment of such straps or the like, and extends no further above the vehicle, when attached thereto, than said effective height of the slat;

each slat being roll-formed from sheet metal to define said sides and flanges, and at least one upper surface spaced above such vehicle body when the carrier is attached to the vehicle so that the slat has an interior volume that is enclosed except at the ends of the slat; and each slat having a cross-sectional contour defined by said sides, flanges and at least one upper surface; and the separate member comprising a tongue that fits within the interior volume of the associated slat; and a cap generally continuous with the tongue and having, adjacent to the tongue, a cross-section that substantially matches the effective cross-sectional contour of the slat;

said cap abutting, in use, the associated end of the slat to close off the interior volume of the slat and substantially extend the effective cross-sectional contour of the slat; and said separate-member strap-attachment means being formed in said cap;

such a bracket being movable on or off the end of the slat where the separate member is, unimpeded by the separate member whereby a user can select use of the luggage carrier without such a bracket, and if such bracket is on the carrier a user can remove such bracket for storage by moving it off the end of the slat where the separate member is, and can constrain such luggage to the carrier by such straps or the like attached to the separate-member strap-attachment means; and a user can select use of the luggage carrier with such a bracket, and if such bracket is not on the carrier a user can install such bracket for use by moving it on over the end of the slat where the separate member is, and can constrain such luggage to the carrier by such straps or the like attached to such bracket strap-attachment means.

5. The luggage carrier of claim 4, wherein:

each slat defines an upper groove that receives and retains a trim strip which extends above the slat; and the effective cross-sectional contour of the slat includes the extension of the trim strip above the slat.

6. The luggage carrier of claim 4, wherein:

each slat has an associated gasket that, in use, rests directly upon such vehicle body, and that has a cross-sectional contour; and the effective cross-sectional contour of the slat includes the cross-sectional contour of the gasket.

7. The luggage carrier of claim 1, wherein:

the separate member comprises (1) a wall that, in use, abuts the ends of the associated slat, said wall having a top and a bottom; and (2) a floor that abuts the bottom of the wall and is disposed upon such vehicle body, said floor, in use, extending away from the associated slat to an end remote from the wall;

the separate-member strap-attachment means comprise an arch extending longitudinally from the top of the wall to the remote end of the floor.

8. The luggage carrier of claim 4, wherein:

the cap of the separate member comprises (1) a wall that, in use, abuts the end of the associated slat, and that has a top and a bottom; and (2) a floor that abuts the bottom of the wall and is disposed upon such vehicle body and that, in use, extends away from the associated slat to a remote end;

the separate-member strap-attachment means comprise an arch extending longitudinal from the top of the wall to the remote end of the floor.

9. The luggage carrier of claim 1, further comprising, on at least one of the slats, at least one such slidable bracket that includes:

a housing having (1) a cover portion, above the slat, the spans the width of the slat and has two opposing edges, (2) fixed to each opposed edge of the cover portion, a wall portion that extends downwardly from the cover portion adjacent to one corresponding side of the slat, past the flange, and (3) extending inwardly from each wall portion, below the flange, a lip that captures the flange to prevent withdrawal of the housing from the slat perpendicularly to the slat while allowing the housing to slide along the salt, a clamping member retained within the housing above the slat, and manually operable means for applying force between the housing and the clamping member to raise the housing relative to the slat so that the lips forcibly engage the flanges to clamp the housing to the slat at any user-selected point along the slat; and fastened to the housing, a tie-down member that is adapted for attachment of such straps or the like.

10. The luggage carrier of claim 1, further comprising:

a luggage-restraining crossbar;

at an end of each one of at least two slats, remote from the end where the respective separate is, an upstanding stanchion that supports one respective end of the crossbar and that is slotted for attachment of such straps or the like;

said stanchion blocking removal of such a bracket from said other end of the associated slat;

whereby such bracket can be moved on or off the associated slat only at the first-mentioned end of the slat, where the separate member is; and wherein if a user selects use of the luggage carrier without such a bracket, such straps or the like can be attached between the slotted stanchion and the separate-member strap-attachment means; and if a user selects use of the luggage carrier with such a bracket, such straps or the like can be attached between the slotted stanchion and the bracket strap-attachment means.

11. The luggage carrier of claim 1, wherein:

each slat is roll-formed from sheet metal to define said sides and flanges, an upper surface spaced above such vehicle body when the carrier is attached to the vehicle, and an upper groove formed in said upper surface, so that the slat has an interior volume that is enclosed except at the ends of the slat; and each slat has a cross-sectional contour defined by said sides, flanges, upper surface and upper groove;

the separate member comprises a tongue that fits within the interior volume of the associated slat; and a cap generally continuous with the tongue and having, adjacent to the tongue, a cross-section that substantially matches the effective cross-sectional contour of the slat;

said cap abuts, in use, the associated end of the slat to close off the interior volume of the slat and substantially extend the effective cross-sectional contour of the slat;

said separate-member strap-attachment means being formed in said cap;

the upper groove receives and retains a trim strip which extends above the slat;

each slat has an associated gasket that, in use, rests directly upon such vehicle body, and that has a thickness;

the effective height of the slat includes the extension of the trim strip above the salt and also includes the thickness of the gasket; and the effective cross-sectional contour of the slat includes the extension of the trim strip above the slat and the cross-sectional contour of the gasket;

the cap of the separate member comprises (1) a wall that, in use, abuts the end of the associated slat, said wall having a top and a bottom; and (2) a floor that abuts the bottom of the wall and is disposed upon such vehicle body, said floor, in use, extending away from the associated slat to an end remote from the wall;

the separate-member strap-attachment means comprise an arch extending longitudinally from the top of the wall to the remote end of the floor.

12. The luggage carrier of claim 11, further comprising, on at least one of the slats, at least one such slidable bracket that includes:

a housing having (1) a cover portion, above the slat, that spans the width of the slat and has two opposing edges, (2) fixed to each opposed edge of the cover portion, a wall portion that extends downwardly from the cover portion adjacent to one corresponding side of the slat, past the flange, and (3) extending inwardly from each wall portion, below the flange, a lip that captures the flange to prevent withdrawal of the housing from the slat perpendicularly to the slat while allowing the housing to slide along the slat, a clamping member retained within the housing above the slat, and manually operable means for applying force between the housing and the clamping member to raise the housing relative to the slat so that the lips forcibly engage the flanges to clamp the housing to the slat at any user-selected point along the slat; and fastened to the housing, a tie-down member that is adapted for attachment of such straps or the like.

13. The luggage carrier of claim 12, further comprising:

a luggage-restraining crossbar;

at another end of each one of at least two slats, remote from the respective separate members, an upstanding stanchion that supports one respective end of the crossbar and that is slotted for attachment of such straps or the like;

said stanchion blocking removal of such a bracket from said other end of the associated slat;

whereby such bracket can be moved on or off the associated slat only at the first-mentioned end of the slat, where the separate member is; and wherein if a user selects use of the luggage carrier without such a bracket, such straps or the like can be attached between the slotted stanchion and the separate-member strap-attachment means; and if a user selects use of the luggage carrier with such a bracket, such straps or the like can be attached between the slotted stanchion and the bracket strap-attachment means.

14. The luggage carrier of claim 1, wherein:
the attachment means of the separate member define a hole formed crosswise of the slat.

15. The luggage carrier of claim 2, wherein:
the attachment means of the separate member define a hole formed crosswise of the slat.

16. The luggage carrier of claim 4, wherein:
the attachment means of the separate member define a hole formed crosswise of the slat.

* * * * *